(12) United States Patent
Moyer (10) Patent No.: US 10,534,721 B2
(45) Date of Patent: Jan. 14, 2020

(54) CACHE REPLACEMENT POLICY BASED ON NON-CACHE BUFFERS

(71) Applicant: ADVANCED MICRO DEVICES, INC., Sunnyvale, CA (US)

(72) Inventor: Paul Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/790,616

(22) Filed: Oct. 23, 2017

(65) Prior Publication Data

US 2019/0121747 A1  Apr. 25, 2019

(51) Int. Cl.
*G06F 12/128* (2016.01)
*G06F 12/0811* (2016.01)
*G06F 12/126* (2016.01)
*G06F 12/127* (2016.01)
*G06F 12/0875* (2016.01)

(52) U.S. Cl.
CPC ........ *G06F 12/128* (2013.01); *G06F 12/0811* (2013.01); *G06F 12/0875* (2013.01); *G06F 12/126* (2013.01); *G06F 12/127* (2013.01); *G06F 2212/283* (2013.01); *G06F 2212/452* (2013.01)

(58) Field of Classification Search
CPC ......... G06F 12/12–128; G06F 12/0811; G06F 12/0875
See application file for complete search history.

(56) References Cited

U.S. PATENT DOCUMENTS

| | | | | |
|---|---|---|---|---|
| 5,832,297 A * | 11/1998 | Ramagopal | ......... | G06F 9/30047 710/5 |
| 6,349,365 B1 * | 2/2002 | McBride | ............... | G06F 12/126 711/133 |
| 2005/0114606 A1 * | 5/2005 | Matick | ................. | G06F 12/122 711/134 |
| 2006/0010311 A1 * | 1/2006 | Osawa | ............... | G06F 9/30181 712/240 |
| 2008/0052466 A1 | 2/2008 | Zulauf | | |
| 2010/0191916 A1 * | 7/2010 | Balakrishnan | ...... | G06F 12/0808 711/134 |
| 2014/0164711 A1 * | 6/2014 | Loh | ..................... | G06F 12/0862 711/136 |

(Continued)

OTHER PUBLICATIONS

Richard Matick, "Computer Storage Systems and Technology", 1977. John Wiley & Sons Inc., pp. 549-551, 564-571 and 627 (Year: 1977).*

(Continued)

*Primary Examiner* — Reginald G Bragdon
*Assistant Examiner* — Curtis James Kortman (57) ABSTRACT

A cache controller determines replacement priority for cache lines at a cache based on data stored at non-cache buffers. In response to determining that a cache line at the cache is to be replaced, the cache controller identifies a set of candidate cache lines for replacement. The cache controller probes the non-cache buffers to identify any entries that are assigned to the same memory address as a candidate cache line and adjusts the replacement priorities for the candidate cache lines based on the probe responses. The cache controller deprioritizes for replacement cache lines associated with entries of the non-cache buffers.

26 Claims, 6 Drawing Sheets

(56) References Cited

U.S. PATENT DOCUMENTS

| | | |
|---|---|---|
| 2014/0189244 A1 | 7/2014 | Grayson et al. |
| 2015/0356019 A1 | 10/2015 | Johar et al. |
| 2017/0046278 A1 | 2/2017 | Clancy et al. |
| 2017/0052905 A1* | 2/2017 | Lin .................. G06F 12/126 |

OTHER PUBLICATIONS

International Search Report and Written Opinion dated Dec. 10, 2018 for corresponding International Application No. PCT/US2018/047995, 12 pages.

* cited by examiner

CACHE REPLACEMENT POLICY BASED ON NON-CACHE BUFFERS

BACKGROUND

To improve memory access efficiency, many processors employ a memory hierarchy that includes one or more caches to store a subset of data stored in main memory. The criteria for which subset of data from the main memory is stored in the cache can vary depending on the processor design, but typically prioritizes the caching of data that has recently been accessed. As new data is moved into the one or more caches, the processor selects previously-stored data for eviction based on a specified replacement scheme, but conventional replacement schemes often result in undesirably low memory access efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for determining replacement priority for cache lines at a cache based at least in part on data (e.g., instructions or memory transactions) stored at non-cache buffers (e.g., an instruction buffer or load/store buffer). In response to determining that a cache line at the cache is to be replaced, a cache controller identifies a set of candidate cache lines for replacement. The cache controller probes the non-cache buffers to identify any entries that are assigned to the same memory address as a candidate cache line and adjusts the replacement priorities for the candidate cache lines based on the probe responses. The cache controller deprioritizes for replacement cache lines associated with entries of the non-cache buffers, thereby reducing memory management overhead and improving processor efficiency.

To illustrate via an example embodiment, a cache controller identifies two cache lines as candidates for replacement, designated Line A and Line B, and each associated with a different memory address, designated Address A and Address B, respectively. Address A is assigned to an entry of a load/store buffer. That is, an entry of the load/store buffer stores a memory transaction that targets Address A. Replacing Line A at the cache would likely result in the processor experiencing a performance penalty, because of the overhead of canceling or invalidating the transaction stored at the load/store buffer, because the evicted cache line will shortly be reloaded to the cache as a result of the memory transaction stored at the load/store buffer, or a combination thereof. Address B, in contrast, is not assigned to an entry of the load/store buffer and thus there is less of a performance penalty for evicting Line B. In response to identifying that Address A is associated with one entry of the load/store buffer and Address B is not associated with any entry of the load/store buffer, the cache controller prioritizes Line B for replacement, thereby improving processing efficiency.

Figure 1:
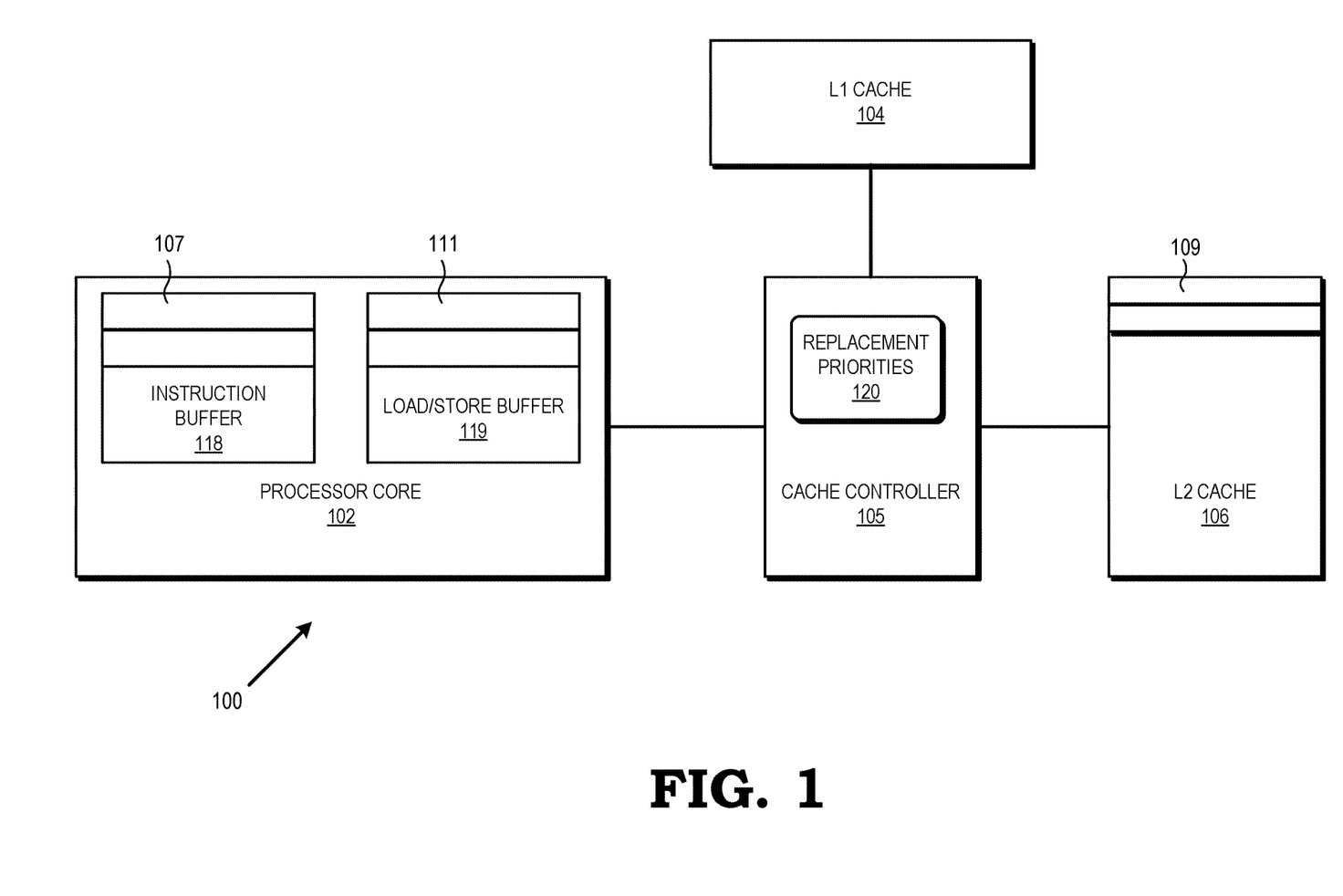
FIG. 1 is a block diagram of a processor that probes non-cache buffers to determine cache replacement priority in accordance with some embodiments.

FIG. 1 illustrates a processor 100 that probes non-cache buffers to determine cache replacement priority in accordance with some embodiments. The processor 100 is generally configured to execute sets of instructions organized in the form of computer programs in order to carry out tasks on behalf of an electronic device. Accordingly, the processor 100 may be used in any of a variety of electronic devices, such as a desktop or laptop computer, server, smartphone, tablet, game console, and the like.

To facilitate execution of instructions, the processor 100 includes at least one processor core 102, an L1 cache 104, a cache controller 105, and an L2 cache 106. The L1 cache 104 and L2 cache 106 are memory devices generally configured to store data, and therefore may be random access memory (RAM) memory modules, non-volatile memory devices (e.g., flash memory), and the like. The processor core 102 includes an instruction pipeline (not shown) having, for example, a fetch stage to fetch instructions, a decode stage to decode each fetched instruction into one or more operations, execution stages to execute the operations, and a retire stage to retire instructions whose operations have completed execution. One set of operations generated based on the instructions are referred to herein as memory transactions, and are requests to load data (load operations) from the memory hierarchy of the processor 100, and requests to store data (store operations) at the memory hierarchy of the processor 100.

In the example embodiment of FIG. 1, the processor core 102 includes two buffers to support the instruction pipeline: an instruction buffer 118 and a load/store buffer 119. The instruction buffer 118 is generally configured to store instructions that are awaiting processing by the instruction pipeline or are in the course of being processed by the instruction pipeline. The load/store buffer 119 is generally configured to store memory transactions that are awaiting provision to or completion at the memory hierarchy for the processor 100.

Both the instruction buffer 118 and the load/store buffer 119 are non-cache buffers of the processor 100. As used herein, a "non-cache buffer" is a buffer of a processor used to store data separately from the caches of a memory hierarchy of the processor. The instruction buffer 118 and the load/store buffer 119 each include a plurality of entries (e.g., entry 107 of the instruction buffer 118), with each entry configured to store a corresponding item for the respective buffer. Thus, each entry of the instruction buffer 118 is configured to store an instruction, while each entry of the load/store buffer 119 (e.g., entry 111) stores a memory transaction. At least some of the entries of each of the instruction buffer 118 and load/store buffer 119 are associated with a memory address in that the information stored at the entry interacts with the memory address in some way. Such entries are referred to herein as "assigned" to the memory address. For example, an entry of the load/store buffer 119 that stores a memory transaction which loads data from or stores data to a memory address is assigned to that memory address. Thus, the address to which an entry is assigned will change as the information stored at the entry changes. It will be appreciated that the instruction buffer 118 and the load/store buffer 119 are examples of non-cache buffers, and that in other embodiments the processor 100 includes additional or different non-cache buffers.

The cache controller 105 is a module generally configured to manage the memory hierarchy of the processor 100 by moving data between the L1 cache 104, the L2 cache 106, and other portions of the memory hierarchy for the processor 100, such as additional caches (not shown) and main memory (not shown). In particular, the L1 cache 104 and L2 cache 106 are memory devices, each of which includes a plurality of entries, whereby each entry (e.g., entry 109 of L2 cache 106) is associated with one or more memory addresses of a system memory (not shown). In particular, each entry of the L1 cache 104 and each entry of the L2 cache 106 is configured to store a unit of data referred to herein as a cache line, wherein each cache line is associated with a corresponding memory address.

The cache controller 105 manages the data stored at the caches 104 and 106 based on memory transactions received from the processor core 102. Thus, in response to a memory transaction, the cache controller 105 reviews the data stored at one or more entries of the L1 cache 104 to determine if any of the entries stores the cache line associated with the memory address targeted by the memory access request. If so, the cache controller 105 indicates a cache hit and satisfies the memory transaction at the identified entry, either by storing data at the entry (in the case of a store operation) or by providing the data at the identified entry to the processor core 102 (in the case of a load operation).

If the cache line associated with the memory address is not stored at an entry of the L1 cache 104, the cache controller 105 indicates a cache miss and reviews the data stored at one or more entries of the L2 cache 106 to determine if any of the entries stores the cache line associated with the memory address targeted by the memory access request. If so, the cache controller 105 indicates a cache hit and satisfies the memory transaction at the identified entry, either by storing data at the entry (in the case of a store operation) or by providing the cache line at the identified entry to the L1 cache 104, from which it is subsequently provided to the processor core 102 (in the case of a load operation). If data associated with the memory address is not stored in an entry of the L2 cache 106, the cache controller 105 indicates a cache miss and issues a request for the cache line to other levels of the memory hierarchy. Upon receipt of the cache line from other levels of the memory hierarchy, the cache controller 105 stores the data at an entry of the L2 cache 106, from which the data is subsequently transferred to the L1 cache 104, and thus satisfying the memory access request.

When a new cache line (that is, a cache line not currently stored at the L2 cache 106) is received by the cache controller 105 for storage at the L2 cache 106, the cache controller 105 identifies if any of the entries of the L2 cache 106 are available to store the cache line. If so, the cache controller 105 stores the cache line at one of the available entries.

If there are no available entries to store the received cache line, the cache controller 105 identifies a cache line for replacement, evicts the identified cache line, and stores the received cache line at the entry that previously stored the evicted cache line. To identify a cache line for replacement, the cache controller employs a stored set of replacement priorities 120. In particular, each of the replacement priorities 120 is a value corresponding to a cache line stored at the L2 cache 106. For purposes of the example embodiment of FIG. 1, it is assumed that the cache controller 105 implements a replacement scheme whereby the higher the value for a cache line, the greater the likelihood that the cache line will be replaced.

To illustrate, the cache controller 105 identifies a cache line for replacement as follows: initially, the cache controller 105 identifies a set of candidate cache lines for replacement. The cache controller 105 can identify the set of candidate cache lines based on any of a variety of criteria. In some embodiments, the L2 cache 106 is a set associative cache, and the set of candidate cache lines are the cache lines stored at the ways of the index corresponding to the memory address of the received cache line that triggered the cache line replacement. The cache controller 105 identifies, from the replacement priorities 120, the replacement priority value for each of the candidate cache lines, and makes any modifications to the replacement priority values as described further herein. The cache controller 105 then compares the resulting replacement priority values for all of the candidate cache lines and selects for replacement the cache line corresponding to the highest replacement priority value. If a subset of the candidate cache lines each have the highest replacement priority value, the cache controller 105 randomly selects the cache line for replacement from the subset. The cache controller 105 then evicts the selected cache line by, for example, writing the selected cache line to a higher level of the memory hierarchy, and stores the received cache line at the entry of the evicted cache line.

The cache controller 105, in one embodiment, sets and modifies the replacement priorities 120 based on any of a variety of criteria. For example, when a cache line is stored at the L2 cache 106, the cache controller can set the replacement priority value to an initial value. In some embodiments, the initial value is the same predetermined value for all cache lines. In other embodiments, the initial value is different depending on the memory address of the cache line, the instruction that caused the cache line to be retrieved, the priority of a program thread that caused the cache line to be retrieved, and the like. Further, in some embodiments, the replacement priority value for a cache line is modified by instructions executed at the processor core 102, by the cache controller 105 or other module based on memory access patterns, and the like, or any combination thereof.

In addition, the cache controller 105 modifies the replacement priority value for a cache line based on whether one or more entries of the instruction buffer 118 and load/store buffer 119 have entries that are assigned to the same memory address as the cache line. To illustrate, after identifying the set of candidate cache lines for replacement, for each candidate cache line the cache controller 105 sends a probe to each of the instruction buffer 118 and load/store buffer 119 with the memory address of the candidate cache line. In response to the probes, the instruction buffer 118 and the load/store buffer 119 send messages to the cache controller 105 indicating the number of entries assigned to the memory address at the corresponding buffer. Based on the messages, the cache controller 105 adjusts the replacement priority values of the candidate cache lines so that the greater number of entries of the buffers 118 and 119 that are assigned to a given memory address, the lower the replacement priority for the candidate cache line associated with that memory address. The cache controller 105 thus ensures that cache lines that are likely to be the subject of additional operations in the relatively near future are less likely to be replaced, thus reducing processor overhead and improving processor efficiency.

Figure 2:
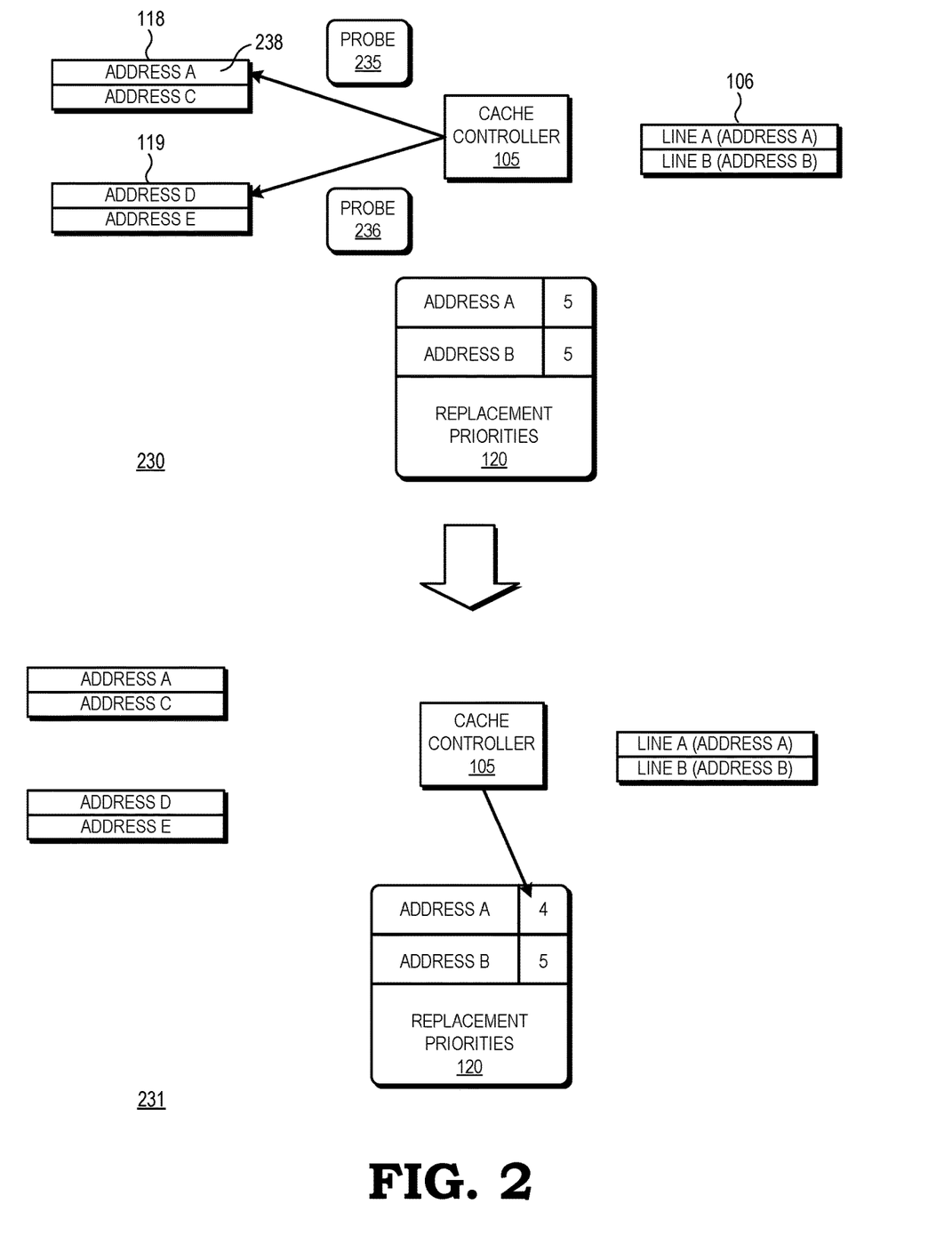
FIG. 2 is a diagram of an example of the processor of FIG. 1 adjusting replacement priorities for a cache based on data stored at non-cache buffers in accordance with some embodiments.

FIG. 2 illustrates an example of the processor 100 adjusting replacement priority values for cache lines of the L2 cache 106 based on data stored at the non-cache buffers 118 and 119 in accordance with some embodiments. At or around a time 230, the cache controller 105 has determined that a cache line of the L2 cache 106 is to be replaced. In response, the cache controller 105 identifies two cache lines as candidates for replacement, designated Line A (associated with a memory address designated Address A) and Line B (associated with a memory address designated Address B). In addition, at time 230 Address A and Address B each has the same replacement priority value of five, stored at the replacement priorities 120.

In response to identifying the candidate cache lines at time 230, the cache controller 105 sends probes 235 and 236 to the instruction buffer 118 and the load/store buffer 119, respectively. Each of the probes 235 and 236 indicates the memory address associated with the corresponding candidate cache line, i.e. Address A and Address B. In response to the probes 235 and 236, the instruction buffer 118 and the load store buffer 119 send messages (not shown) to the cache controller 105 indicating the number of entries of the respective buffer that are assigned to Address A and the number of entries of the respective buffer that are assigned to Address B. In the illustrated example of FIG. 2, entry 238 of the instruction buffer 118 is assigned to Address A. No other entries of either buffer 118 and buffer 119 are assigned to Address A, nor are any entries of either buffer 118 and buffer 119 assigned to Address B. Accordingly, at time 231 the cache controller 105 adjusts the replacement priority value for Address A to four, and maintains the replacement priority value for Address B at five.

After adjusting the replacement priority values for the candidate Lines A and B, the cache controller 105 compares the replacement priority values and determines that the replacement priority value corresponding to Address A is less than the replacement priority value for Address B. In response, the cache controller selects Line B for replacement, and therefore evicts Line B.

Figure 3:
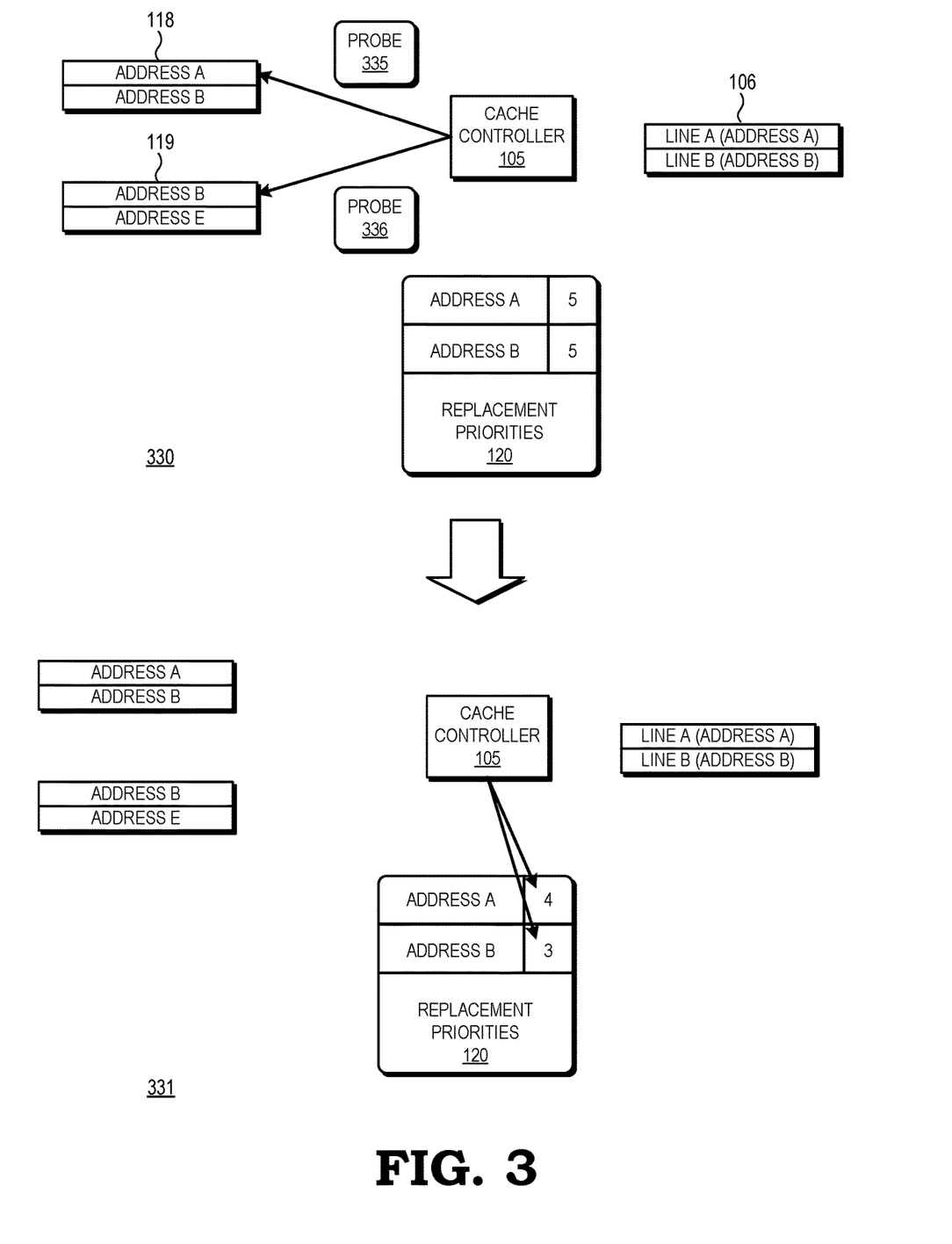
FIG. 3 is a diagram of another example of the processor of FIG. 1 adjusting replacement priorities for a cache based on data stored at non-cache buffers in accordance with some embodiments.

In some embodiments, the cache controller 105 adjusts the replacement priority values for each candidate cache line based on the number of entries of the buffers 118 and 119 that are assigned to the corresponding memory addresses of each candidate cache line. An example is illustrated by FIG. 3 in accordance with some embodiments. In the depicted example, at or around a time 330, the cache controller 105 has determined that a cache line of the L2 cache 106 is to be replaced and has identified two cache lines as candidates for replacement, designated Line A (associated with a memory address designated Address A) and Line B (associated with a memory address designated Address B). Line A and Line B, at time 330, each has the same replacement priority value of five, stored at the replacement priorities 120.

In response to identifying the candidate cache lines, the cache controller 105 sends probes 335 and 336 to the instruction buffer 118 and the load/store buffer 119, respectively, indicating the memory addresses associated with the candidate cache lines. In response to the probes 335 and 336, the instruction buffer 118 and the load store buffer 119 send messages (not shown) to the cache controller 105 indicating the number of entries of the respective buffer that are assigned to Address A and the number of entries of the respective buffer that are assigned to Address B. In the illustrated example of FIG. 3 the buffer 118 has one entry assigned to Address A and one entry assigned to Address B. Buffer 119 has one entry assigned to Address B and no entries assigned to Address A.

Thus, in the example of FIG. 3, between the buffers 118 and 119, there are two entries assigned to Address B and one entry assigned to Address A. Accordingly, at time 331 the cache controller 105 adjusts the replacement priority value for Address A to four, and adjusts the replacement priority value for Address B to three. After adjusting the replacement priority values for the candidate Lines A and B, the cache controller 105 compares the values and determines that the replacement priority value corresponding to Address B is less than the replacement priority value for Address A. In response, the cache controller selects Line A for replacement, and therefore evicts Line A.

In some embodiments, the cache controller 105 adjusts the replacement priority values for each candidate cache line differently for the entries of the buffers 118 and 119. That is, the buffers 118 and 119 are weighted differently with respect to their impact on replacement priority values. In some embodiments, the weight for each of the buffers 118 and 119 is based on the performance penalty associated with invalidating an entry of the buffer. Thus, by weighting the adjustments in replacement priority values differently for different buffers, the replacement priority values more closely correspond to processor performance penalties, thereby improving processor performance.

Figure 4:
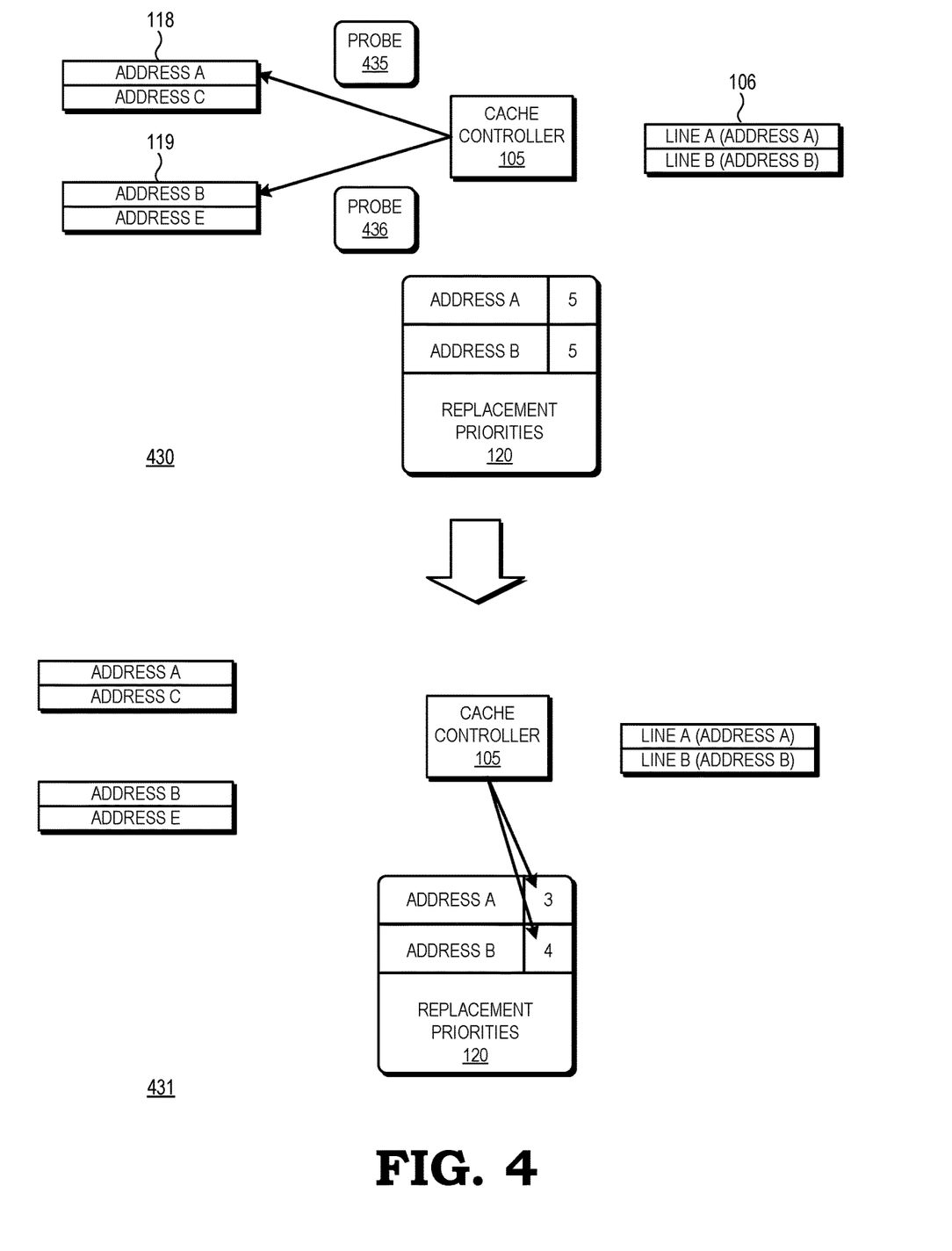
FIG. 4 is a diagram of yet another example of the processor of FIG. 1 adjusting replacement priorities for a cache based on data stored at non-cache buffers in accordance with some embodiments.

An example is illustrated at FIG. 4 in accordance with some embodiments. In the depicted example, at or around a time 430, the cache controller 105 has determined that a cache line of the L2 cache 106 is to be replaced and has identified two cache lines as candidates for replacement, designated Line A (associated with a memory address designated Address A) and Line B (associated with a memory address designated Address B). Line A and Line B, at time 430, each have the same replacement priority value of five, stored at the replacement priorities 120. Further, for the example of FIG. 4, it is assumed that the buffer 118 has a priority adjustment weight of two, and the buffer 119 has a priority adjustment weight of one.

In response to identifying the candidate cache lines, the cache controller 105 sends probes 435 and 436 to the instruction buffer 118 and the load/store buffer 119, respectively, indicating the memory addresses associated with the candidate cache lines. In response to the probes 435 and 436, the instruction buffer 118 and the load store buffer 119 send messages (not shown) to the cache controller 105 indicating the number of entries of the respective buffer that are assigned to Address A and the number of entries of the respective buffer that are assigned to Address B. In the illustrated example of FIG. 4 the buffer 118 has one entry assigned to Address A and no entries assigned to Address B. Buffer 119 has one entry assigned to Address B and no entries assigned to Address A.

At time 431 the cache controller 105 adjusts the replacement priority value for Address A from five to three, because the priority adjustment weight for the buffer 118 is two. In contrast, the cache controller 105 adjusts the replacement priority value for Address B from five to four, because the priority adjustment weight for the buffer 119 is one. After adjusting the replacement priority values for the candidate Lines A and B, the cache controller 105 compares the values and determines that the replacement priority value corresponding to Address A is less than the replacement priority value for Address B. In response, the cache controller selects Line B for replacement, and therefore evicts Line B.

As noted above, in some embodiments the cache controller 105 sends a separate probe to each of the buffers 118 and 119 for each candidate cache line, and receives a separate message from each of the buffers 118 and 119 for each cache line indicating the entries of the respective buffer corresponding to that cache line. However, in some scenarios this approach results in a relatively high amount of communication traffic at the processor 100. Accordingly, in some embodiments the buffers 118 and 119 include a table (not shown) or other data structure that indicate, for a particular memory address, all of the candidate replacement cache lines for that memory address. For example, in some embodiments the candidate replacement cache lines are all the cache lines stored at the ways of a given cache set. The buffers 118 and 119 therefore are able to identify the candidate cache lines from a single probe that communicates a single memory address or other value indicative of the index associated with the cache set. In turn, the buffers 118 and 119 are able to respond to the probe with a list of all the entries of the respective buffer assigned to memory addresses associated with the cache set.

Figure 5:
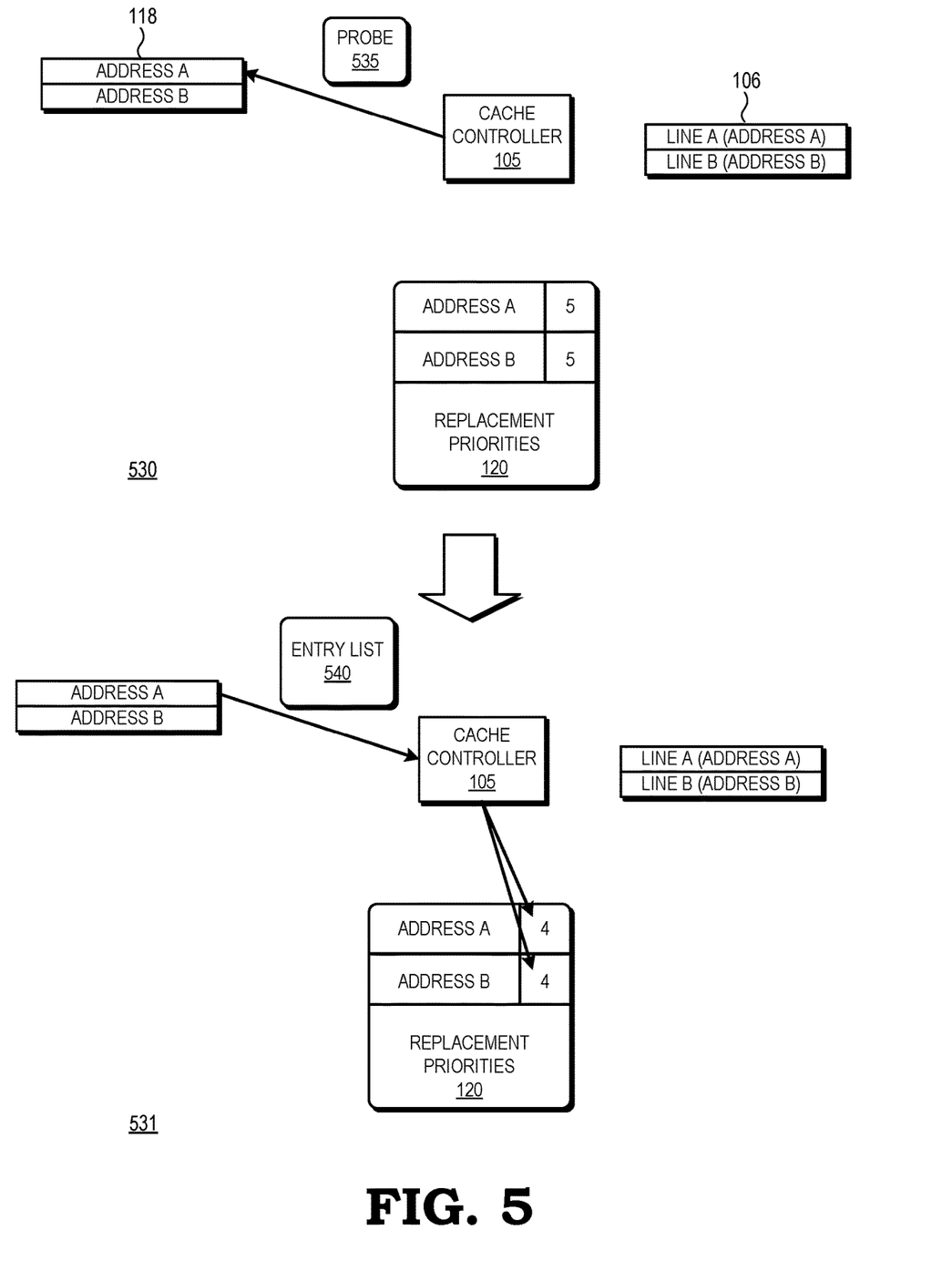
FIG. 5 is a diagram of a non-cache buffer of the processor of FIG. 1 providing a list of buffer entries in response to a probe in accordance with some embodiments.

An example is illustrated at FIG. 5 in accordance with some embodiments. In the depicted example, at or around a time 530, the cache controller 105 has determined that a cache line of the L2 cache 106 is to be replaced and has identified two cache lines as candidates for replacement, designated Line A (associated with a memory address designated Address A) and Line B (associated with a memory address designated Address B). In response to identifying the candidate cache lines, the cache controller 105 sends a probe 535 to the instruction buffer 118. For clarity, the probe sent to the buffer 119 is not illustrated in FIG. 5.

The probe 535 includes a memory address or other value, such as a memory address index, that allows the buffer 118 to identify all of the memory addresses corresponding to the candidate cache lines, and therefore identify all entries assigned to those memory addresses. In the illustrated example, the buffer 118 includes one entry assigned to Address A and one entry assigned to Address B. Accordingly, at time 531, the buffer 118 sends an entry list 540, indicating the number of entries corresponding to each of the plurality of memory addresses indicated by the probe 535. Thus, rather than separate probes and separate messages for each candidate cache line, in the embodiment of FIG. 5 the buffer 118 provides a single message with a list of entries for all of the candidate cache lines, thereby reducing communication traffic at the processor 100.

Figure 6:
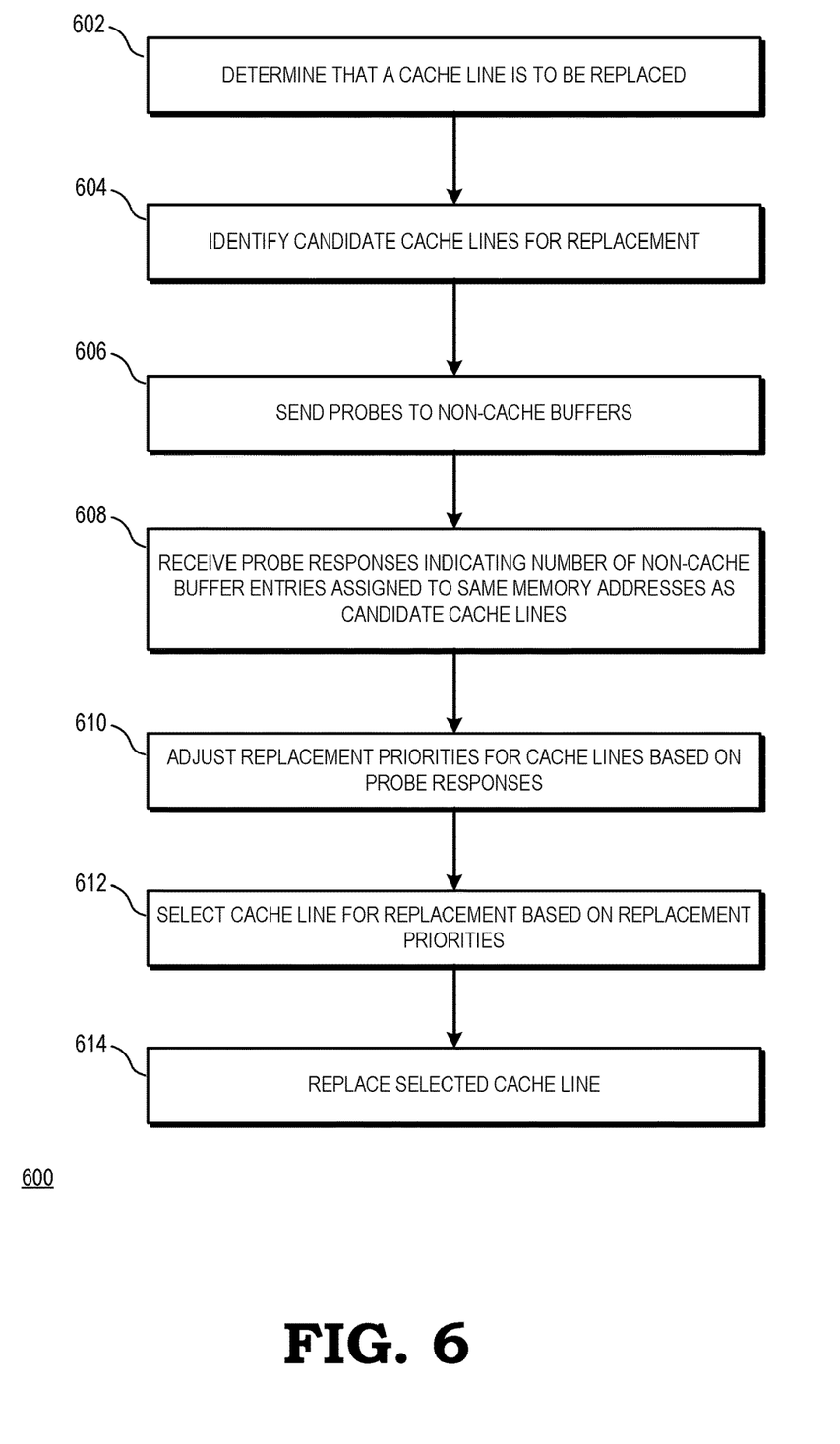
FIG. 6 is a flow diagram of a method of adjusting replacement priorities for a cache based on data stored at non-cache buffers in accordance with some embodiments.

FIG. 6 is a flow diagram of a method 600 of adjusting replacement priorities for a cache based on data stored at non-cache buffers in accordance with some embodiments. The method 600 is described with respect to an example implementation at the processor 100 of FIG. 1. At block 602 the cache controller 105 has determined that a cache line of the L2 cache 106 is to be replaced by a received cache line. Accordingly, at block 604 the cache controller 105 identifies a set of candidate cache lines that are candidates to be replaced. At block 606 the cache controller 105 sends probes to the non-cache buffers 118 and 119 identifying the memory addresses corresponding to the candidate cache lines. In some embodiments the cache controller 105 also sends probes to the L1 cache 104 identifying the memory addresses corresponding to the candidate cache lines.

At block 608 the cache controller 105 receives responses to the probes from the buffers 118 and 119, as well as from the L1 cache 104. The responses indicate, for each cache line, the number of non-cache buffer entries that are assigned to the corresponding memory addresses, as well as whether the L1 cache 104 stores the cache line. At block 610 the cache controller 105 adjusts the replacement priority value for each cache line based on the probe responses. At block 612, based on the adjusted replacement priority values the cache controller 105 selects one of the candidate cache lines as the actual cache line for replacement. At block 614 the cache controller 105 replaces the selected cache line by evicting the selected cache line and storing the received cache line at the same entry of the L2 cache 106.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
storing a first cache line at a first cache of a processor, the first cache line corresponding to a first memory address;
in response to determining that a first entry of a first non-cache buffer of the processor is assigned to the first memory address, adjusting a first replacement priority for the first cache line by a first adjustment;
in response to identifying a set of candidate cache lines as candidates for replacement, receiving a probe at the first non-cache buffer requesting an indication whether the first non-cache buffer includes an entry assigned to the first memory address;
selecting a cache line from the set of candidate cache lines for replacement at the first cache based on the first replacement priority; and
replacing the selected cache line at the first cache.

2. The method of claim 1, wherein adjusting the first replacement priority comprises adjusting the first replacement priority to reduce a likelihood that the first cache line will be selected for replacement at the first cache.

3. The method of claim 1, further comprising:
in response to determining that a second entry of a second non-cache buffer of the processor is assigned to the first memory address, adjusting the first replacement priority for the first cache line by a second adjustment.

4. The method of claim 1, further comprising:
in response to determining that a second entry of a second cache of the processor is assigned to the first memory address, adjusting the first replacement priority for the first cache line by a second adjustment.

5. The method of claim 1, further comprising:
in response to the probe, providing a list of a plurality of entries of the first non-cache buffer including the first entry, each of the plurality of entries assigned to a different memory address.

6. The method of claim 5, wherein each of the plurality of entries is associated with a common index of the first cache.

7. The method of claim 1, wherein the first non-cache buffer comprises a load/store buffer that stores memory transactions that are awaiting completion at the first cache.

8. The method of claim 1, wherein the first non-cache buffer comprises an instruction buffer that stores instructions to be executed at a processor core of the processor.

9. A method, comprising:
in response to receiving an indication that a cache line of a cache of a processor is to be replaced:
identifying a candidate cache line of the cache for replacement;
sending probes to a plurality of non-cache buffers indicating a memory address corresponding to the candidate cache line;
receiving, in response to the probes, probe responses indicating whether the plurality of non-cache buffers include entries assigned to the memory address; and
adjusting a replacement priority for the candidate cache line based on the probe responses;
selecting a cache line of the cache for replacement based on the replacement priority for the candidate cache line; and
replacing the selected cache line at the cache.

10. The method of claim 9, wherein at least one of the probe responses comprises a list of all entries assigned to the memory address for one of the plurality of non-cache buffers.

11. The method of claim 9, wherein adjusting the replacement priority comprises adjusting the replacement priority by an amount based on a number of non-cache buffers that include entries assigned to the memory address.

12. The method of claim 9, wherein the plurality of non-cache buffers includes a load/store buffer and an instruction buffer.

13. A processor, comprising:
a first cache to store a first cache line corresponding to a first memory address;
a first non-cache buffer comprising a first entry; and
a cache controller to:
in response to determining that the first entry of the first non-cache buffer is assigned to the first memory address, adjust a first replacement priority for the first cache line by a first adjustment; and
identify a cache line as a candidate for replacement at the first cache based on the first replacement priority;
wherein the first non-cache buffer is to, in response to the cache controller identifying the cache line as a candidate for replacement, receive a probe requesting an indication whether the first non-cache buffer includes an entry assigned to the first memory address; and
wherein the cache controller is further configured to select a candidate cache line as a cache line for replacement and replace the selected cache line at the first cache.

14. The processor of claim 13, wherein the cache controller is to adjust the first replacement priority to reduce a likelihood that the first cache line will be selected for replacement at the first cache.

15. The processor of claim 13, further comprising:
a second non-cache buffer comprising a second entry; and
wherein the cache controller is to adjust the first replacement priority for the first cache line by a second adjustment in response to determining that the second entry of the second non-cache buffer is assigned to the first memory address.

16. The processor of claim 13, further comprising:
a second cache comprising a second entry; and
wherein the cache controller is to adjust the first replacement priority for the first cache line by a second adjustment in response to determining that the second entry of the second cache of the processor is assigned to the first memory address.

17. The processor of claim 13, wherein the first non-cache buffer is to:
in response to the probe, provide a list of a plurality of entries of the first non-cache buffer including the first entry, each of the plurality of entries assigned to a different memory address.

18. The processor of claim 17, wherein each of the plurality of entries is associated with a common index of the first cache.

19. The processor of claim 13, wherein the first non-cache buffer comprises a load/store buffer that stores memory transactions that are awaiting completion at the first cache.

20. The processor of claim 13, wherein the first non-cache buffer comprises an instruction buffer that stores instructions to be executed at a processor core of the processor.

21. A method, comprising:
storing a plurality of cache lines at a first cache at a processor;
in response to receiving a first cache line at the first cache of a processor, identifying a set of candidate cache lines from the plurality of cache lines;

setting a replacement priority value for each cache line in the set of candidate cache lines based on replacement priorities implemented by a cache controller;

sending probes to a plurality of non-cache buffers indicating memory addresses corresponding to each of the candidate cache lines;

receiving, in response to the probes, probe responses indicating whether the plurality of non-cache buffers include entries assigned to the memory addresses;

adjusting the replacement priority value for at least a subset of the candidate cache lines based on the probe responses;

selecting a candidate cache line for replacement based the replacement priority value for each cache line in the set of candidate cache lines; and replacing the selected candidate cache line at the first cache.

22. The method of claim 21, wherein the first cache is a set associative cache and the set of candidate cache lines are cache lines stored at a way of an index corresponding to a memory address of the first cache line.

23. The method of claim 21, further comprising:

in response to identifying the set of candidate cache lines, including a first candidate cache line, receiving a first probe at a first non-cache buffer requesting an indication whether the first non-cache buffer includes an entry associated with a memory address that is associated with the first candidate cache line; and in response to the first probe, sending a first response from the first non-cache buffer to the cache controller indicating a number of entries assigned to the memory address associated with the first candidate cache line.

24. The method of claim 23, further comprising:

in response to the first response, adjusting the replacement priority value of the first candidate cache line based on the number of entries assigned to the memory address associated with the first candidate cache line.

25. The method of claim 24, further comprising:

receiving a second probe at a second non-cache buffer requesting an indication whether the second non-cache buffer includes an entry assigned to a memory address associated with the first candidate cache line;

in response to the second probe, sending a second message from the second non-cache buffer to the cache controller indicating a number of entries assigned to the memory address associated with the first candidate cache line; and in response to the second message, adjusting the replacement priority value of the first candidate cache line based on the number of entries assigned to the memory address associated with the first candidate cache line.

26. The method of claim 25, wherein adjusting the replacement priority value is based at least in part on whether the number of entries was received from the first non-cache buffer or the second non-cache buffer.

* * * * *